(12) United States Patent
Paolini, Jr. et al.

(10) Patent No.: US 11,761,123 B2
(45) Date of Patent: Sep. 19, 2023

(54) SWITCHING RIBBONS FOR TEXTILES

(71) Applicant: E Ink Corporation, Billerica, MA (US)

(72) Inventors: Richard J. Paolini, Jr., Framingham, MA (US); Mihai Ibanescu, Somerville, MA (US); Stephen Bull, Windham, NH (US); Jay William Anseth, Canton, MA (US)

(73) Assignees: E Ink Corporation, Billerica, MA (US); Advanced Functional Fabrics of America, Inc., Cambridge, MA (US)

( * ) Notice: Subject to any disclaimer, the term of this patent is extended or adjusted under 35 U.S.C. 154(b) by 476 days.

(21) Appl. No.: 16/986,317

(22) Filed: Aug. 6, 2020

(65) Prior Publication Data

US 2021/0040654 A1   Feb. 11, 2021

Related U.S. Application Data

(60) Provisional application No. 62/883,699, filed on Aug. 7, 2019.

(51) Int. Cl.
*D02G 3/44* (2006.01)
*B32B 27/36* (2006.01)
(Continued)

(52) U.S. Cl.
CPC ........... *D02G 3/441* (2013.01); *B32B 27/365* (2013.01); *D01F 8/04* (2013.01); *G02F 1/167* (2013.01);
(Continued)

(58) Field of Classification Search
CPC ...... G02F 1/167; G02F 1/0115; G02F 1/0118; D02G 3/441; D01F 8/04; B32B 27/365; H01B 7/08; D03D 1/0088; D03D 15/547; D10B 2401/16; D10B 2401/20; D10B 2401/18
See application file for complete search history.

(56) References Cited

U.S. PATENT DOCUMENTS 3,852,401 A   12/1974   Suzuki et al.
4,659,619 A    4/1987   Tate
(Continued)

FOREIGN PATENT DOCUMENTS

CN    1807707 A     7/2006
CN  101070672 A    11/2007
(Continued)

OTHER PUBLICATIONS

Wood, D., "An Electrochromic Renaissance?" Information Display, 18(3), 24 (Mar. 2002).
(Continued)

*Primary Examiner* — Jennifer A Gillett
(74) *Attorney, Agent, or Firm* — Brian D. Bean (57) ABSTRACT

A fiber capable of switching optical states is provided. The fiber includes a laminate having a first electrode layer, a second electrode layer, and an electro-optic material between the first and second electrode layers, at least one of the first and second electrode layers being light-transmissive and a sheath surrounding the laminate. The fiber may have a ribbon-like structure, i.e. a width that is substantially greater than its thickness. The electro-optic medium may be an encapsulated electrophoretic medium.

14 Claims, 7 Drawing Sheets

(51) Int. Cl.
*D01F 8/04* (2006.01)
*H01B 7/08* (2006.01)
*G02F 1/167* (2019.01)

(52) U.S. Cl.
CPC ........... *H01B 7/08* (2013.01); *D10B 2401/16* (2013.01); *D10B 2401/20* (2013.01)

(56) References Cited

U.S. PATENT DOCUMENTS

| | | |
|---|---|---|
| 4,756,958 A | 7/1988 | Bryant et al. |
| 4,815,355 A | 3/1989 | Cavaness |
| 4,917,920 A | 4/1990 | Ono et al. |
| 5,760,761 A | 6/1998 | Sheridon |
| 5,777,782 A | 7/1998 | Sheridon |
| 5,808,783 A | 9/1998 | Crowley |
| 5,930,026 A | 7/1999 | Jacobson |
| 5,961,804 A | 10/1999 | Jacobson |
| 6,017,584 A | 1/2000 | Albert et al. |
| 6,054,071 A | 4/2000 | Mikkelsen, Jr. |
| 6,055,091 A | 4/2000 | Sheridon |
| 6,067,185 A | 5/2000 | Albert et al. |
| 6,072,619 A | 6/2000 | Kiryuschev et al. |
| 6,097,531 A | 8/2000 | Sheridon |
| 6,120,588 A | 9/2000 | Jacobson |
| 6,120,839 A | 9/2000 | Comiskey et al. |
| 6,128,124 A | 10/2000 | Silverman |
| 6,130,774 A | 10/2000 | Albert et al. |
| 6,137,467 A | 10/2000 | Sheridon |
| 6,147,791 A | 11/2000 | Sheridon |
| 6,172,798 B1 | 1/2001 | Albert et al. |
| 6,229,827 B1 * | 5/2001 | Fernald ................ G02B 6/0218 372/64 |
| 6,241,921 B1 | 6/2001 | Jacobson et al. |
| 6,249,271 B1 | 6/2001 | Albert et al. |
| 6,262,706 B1 | 7/2001 | Albert et al. |
| 6,262,833 B1 | 7/2001 | Loxley et al. |
| 6,300,932 B1 | 10/2001 | Albert |
| 6,301,038 B1 | 10/2001 | Fitzmaurice |
| 6,323,989 B1 | 11/2001 | Jacobson et al. |
| 6,327,072 B1 | 12/2001 | Comiskey et al. |
| 6,377,387 B1 | 4/2002 | Duthaler et al. |
| 6,392,785 B1 | 5/2002 | Albert et al. |
| 6,392,786 B1 | 5/2002 | Albert |
| 6,459,418 B1 | 10/2002 | Comiskey et al. |
| 6,515,649 B1 | 2/2003 | Albert et al. |
| 6,538,801 B2 | 3/2003 | Jacobson et al. |
| 6,542,284 B2 | 4/2003 | Ogawa |
| 6,580,545 B2 | 6/2003 | Morrison et al. |
| 6,652,075 B2 | 11/2003 | Jacobson |
| 6,693,620 B1 | 2/2004 | Herb et al. |
| 6,721,083 B2 | 4/2004 | Jacobson et al. |
| 6,727,881 B1 | 4/2004 | Albert et al. |
| 6,756,120 B2 | 6/2004 | Smith et al. |
| 6,822,782 B2 | 11/2004 | Honeyman |
| 6,839,158 B2 | 1/2005 | Albert et al. |
| 6,866,760 B2 | 3/2005 | Paolini, Jr. et al. |
| 6,870,657 B1 | 3/2005 | Fitzmaurice |
| 6,870,661 B2 | 3/2005 | Pullen et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,982,178 B2 | 1/2006 | LeCain et al. |
| 6,987,603 B2 | 1/2006 | Paolini, Jr |
| 7,002,728 B2 | 2/2006 | Pullen et al. |
| 7,006,063 B2 | 2/2006 | Maeda |
| 7,012,600 B2 | 3/2006 | Zehner et al. |
| 7,012,735 B2 | 3/2006 | Honeyman |
| 7,038,655 B2 | 5/2006 | Herb et al. |
| 7,061,663 B2 | 6/2006 | Cao et al. |
| 7,071,913 B2 | 7/2006 | Albert et al. |
| 7,072,095 B2 | 7/2006 | Liang et al. |
| 7,075,502 B1 | 7/2006 | Drzaic et al. |
| 7,079,305 B2 | 7/2006 | Paolini, Jr. et al. |
| 7,109,968 B2 | 9/2006 | Albert et al. |
| 7,110,164 B2 | 9/2006 | Paolini, Jr. et al. |
| 7,116,318 B2 | 10/2006 | Amundson et al. |
| 7,144,942 B2 | 12/2006 | Zang et al. |
| 7,170,670 B2 | 1/2007 | Webber |
| 7,173,752 B2 | 2/2007 | Doshi et al. |
| 7,180,649 B2 | 2/2007 | Morrison et al. |
| 7,184,197 B2 | 2/2007 | Liang et al. |
| 7,202,991 B2 | 4/2007 | Zhang et al. |
| 7,230,750 B2 | 6/2007 | Whitesides et al. |
| 7,230,751 B2 | 6/2007 | Whitesides et al. |
| 7,236,290 B1 | 6/2007 | Zhang |
| 7,236,291 B2 | 6/2007 | Kaga et al. |
| 7,242,513 B2 | 7/2007 | Albert et al. |
| 7,247,379 B2 | 7/2007 | Pullen |
| 7,304,634 B2 | 12/2007 | Albert et al. |
| 7,312,784 B2 | 12/2007 | Baucom et al. |
| 7,312,916 B2 | 12/2007 | Pullen et al. |
| 7,321,459 B2 | 1/2008 | Masuda |
| 7,339,715 B2 | 3/2008 | Webber et al. |
| 7,375,875 B2 | 5/2008 | Whitesides |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,453,445 B2 | 11/2008 | Amundson |
| 7,477,444 B2 | 1/2009 | Cao et al. |
| 7,531,235 B2 | 5/2009 | Den Toonder et al. |
| 7,532,388 B2 | 5/2009 | Whitesides et al. |
| 7,535,624 B2 | 5/2009 | Amundson et al. |
| 7,561,324 B2 | 7/2009 | Duthaler et al. |
| 7,579,078 B2 | 8/2009 | Hartmann et al. |
| 7,679,814 B2 | 3/2010 | Paolini, Jr. et al. |
| 7,715,088 B2 | 5/2010 | Liang et al. |
| 7,746,544 B2 | 6/2010 | Comiskey et al. |
| 7,839,564 B2 | 11/2010 | Whitesides et al. |
| 7,848,006 B2 | 12/2010 | Wilcox |
| 7,848,007 B2 | 12/2010 | Paolini, Jr. et al. |
| 7,903,319 B2 | 3/2011 | Honeyman et al. |
| 7,910,175 B2 | 3/2011 | Webber |
| 7,952,790 B2 | 5/2011 | Honeyman |
| 7,955,532 B2 | 6/2011 | Liang |
| 3,009,348 A1 | 8/2011 | Zehner et al. |
| 8,018,640 B2 | 9/2011 | Whitesides |
| 8,035,886 B2 | 10/2011 | Jacobson |
| 8,047,681 B2 | 11/2011 | Howng et al. |
| 8,107,153 B2 | 1/2012 | Sotzing et al. |
| 8,115,729 B2 | 2/2012 | Danner et al. |
| 8,129,655 B2 | 3/2012 | Jacobson et al. |
| 8,199,395 B2 | 6/2012 | Whitesides |
| 8,207,511 B2 | 6/2012 | Bortz et al. |
| 8,270,064 B2 | 9/2012 | Feick et al. |
| 8,282,232 B2 | 10/2012 | Hsu et al. |
| 8,305,341 B2 | 11/2012 | Arango et al. |
| 8,319,759 B2 | 11/2012 | Jacobson et al. |
| 8,390,918 B2 | 3/2013 | Wilcox et al. |
| 8,446,664 B2 | 5/2013 | Chen et al. |
| 8,582,196 B2 | 11/2013 | Walls et al. |
| 8,593,718 B2 | 11/2013 | Comiskey et al. |
| 8,717,664 B2 | 5/2014 | Wang et al. |
| 8,769,836 B2 | 7/2014 | Donovan et al. |
| 8,822,782 B1 | 9/2014 | Cunnyngham et al. |
| 9,005,494 B2 | 4/2015 | Valianatos et al. |
| 9,244,326 B2 | 1/2016 | Zhou et al. |
| 9,279,906 B2 | 3/2016 | Kang |
| 9,366,935 B2 | 6/2016 | Du et al. |
| 9,372,380 B2 | 6/2016 | Du et al. |
| 9,441,122 B2 | 9/2016 | Zhou et al. |
| 9,633,579 B2 | 4/2017 | McLeod et al. |
| 9,733,541 B2 | 8/2017 | Shuto et al. |
| 9,777,201 B2 | 10/2017 | Widger et al. |
| 9,863,920 B2 | 1/2018 | Gaynor et al. |
| 9,921,451 B2 | 3/2018 | Telfer et al. |
| 10,174,232 B2 | 1/2019 | Bzowej et al. |
| 10,372,008 B2 | 8/2019 | Telfer et al. |
| 10,444,553 B2 | 10/2019 | Laxton |
| 2001/0009352 A1 | 7/2001 | Moore |
| 2003/0194578 A1 | 10/2003 | Tam et al. |
| 2005/0012980 A1 | 1/2005 | Wilcox et al. |
| 2005/0156340 A1 | 7/2005 | Valianatos et al. |
| 2007/0091417 A1 | 4/2007 | Cao et al. |

(56) References Cited

U.S. PATENT DOCUMENTS

| | | |
|---|---|---|
| 2007/0197115 A1 | 8/2007 | Eves et al. |
| 2008/0130092 A1 | 6/2008 | Whitesides et al. |
| 2008/0158651 A1* | 7/2008 | Kawase ............... G02F 1/167 |
| | | 359/296 |
| 2008/0316580 A1 | 12/2008 | Gillies et al. |
| 2009/0009852 A1 | 1/2009 | Honeyman et al. |
| 2009/0122389 A1 | 5/2009 | Whitesides et al. |
| 2009/0206499 A1 | 8/2009 | Whitesides |
| 2009/0225398 A1 | 9/2009 | Duthaler et al. |
| 2010/0148385 A1 | 6/2010 | Balko et al. |
| 2011/0073353 A1 | 3/2011 | Lee et al. |
| 2011/0286081 A1 | 11/2011 | Jacobson |
| 2012/0274616 A1 | 11/2012 | Scribner et al. |
| 2014/0011913 A1 | 1/2014 | Du et al. |
| 2014/0093731 A1 | 4/2014 | Bonfiglio et al. |
| 2015/0005720 A1 | 1/2015 | Zang |
| 2016/0012710 A1 | 1/2016 | Lu et al. |
| 2017/0342601 A1* | 11/2017 | Umebayashi .......... D01D 5/003 |
| 2018/0271180 A1 | 9/2018 | Kim et al. |
| 2018/0363173 A1 | 12/2018 | Keating et al. |
| 2018/0364518 A1 | 12/2018 | Paolini, Jr. et al. |
| 2019/0146299 A1 | 5/2019 | Kaino et al. |

FOREIGN PATENT DOCUMENTS

| | | |
|---|---|---|
| CN | 106705829 A | 5/2017 |
| JP | 2004070206 A | 3/2004 |
| KR | 20180013007 A1 | 7/2018 |
| TW | 200916620 A | 4/2009 |
| TW | 201211339 A | 3/2012 |
| TW | M531957 U | 11/2016 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

* cited by examiner

SWITCHING RIBBONS FOR TEXTILES

RELATED CASES

This application claims priority to U.S. Provisional Patent Application No. 62/883,699, filed Aug. 7, 2019. All patents, patent applications, and references disclosed herein are incorporated by reference in their entireties.

STATEMENT OF U.S. GOVERNMENT SUPPORT

This invention was made with U.S. Government support under Agreement No. W15QKN-16-3-0001 awarded by the ACC-NJ. The U.S. Government has certain rights in the invention.

BACKGROUND

This invention relates to electro-optic ribbons. More specifically, in one aspect this invention relates to ribbon-like materials having an electrically switchable optical property, such as a color, and methods of making the ribbon-like materials.

There are many applications for clothing that can change on demand. If modern fabrics were able to change color on demand, a consumer could dramatically reduce the number of articles of clothing that he or she purchased in a lifetime. It would no longer be necessary to have, for example, three different blouses of nearly identical cut but different color. The consumer could simply chose the color (or pattern) needed depending upon the event, season, etc. In this way, color changing fabrics could greatly reduce the environmental impact of clothing. It is estimated that Americans currently discard about 14 million tons of clothing per year into landfills. Additionally, replacing these clothes is resource-intensive regardless of their source, e.g., cotton, wool, or petrochemicals.

Other advantages that may be realized with color changing clothing include adjustable camouflage and sportswear. For example, a baseball team would no longer require two different uniforms, the color could be changed depending upon whether the team was home or away. In another example, the color and/or contrast of camouflage hunting gear may be adjusted by a user depending on the color of the surrounding foliage, the type of season, or the time of day.

A variety of technologies have been identified for creating fabrics that are able to reversibly change colors. These technologies include thermochromic dyes, which change color when exposed to different temperatures, photochromic dyes, which change color when exposed to sunlight, integrated LEDs, which can be illuminated on demand, and liquid crystal inks, which allow different colors to be shown (or not) with the presence of a supplied electric field. These technologies have been highlighted in various prototypes, but only the thermochromic dyes have been widely incorporated into clothing. See "Hypercolor" t-shirts sold by Generra Sportswear. However, because the thermochromic clothing is heat sensitive, the color patterns are variable and, in some cases embarrassing. For example, the underarms may be consistently a different shade when the t-shirt is worn. Also, after prolonged exposure to intense heat in a household dryer the clothing would no longer switch colors.

Accordingly, there is a need for inexpensive and robust fabrics that can change color on demand.

SUMMARY OF THE INVENTION

In one aspect, a fiber is provided that is capable of switching optical states. The fiber comprises a laminate having a cross-sectional width greater than a thickness of the laminate, the laminate comprising a first electrode layer, a second electrode layer, and an electro-optic material between the first and second electrode layers, at least one of the first and second electrode layers being light-transmissive; and a sheath surrounding the laminate. The fiber may have a ribbon-like structure, i.e. a width that is substantially greater than its thickness. The electro-optic medium may be an encapsulated electrophoretic medium.

These and other aspects of the various embodiments of the present invention will be apparent in view of the following description.

BRIEF DESCRIPTION OF THE DRAWINGS

The drawing Figures depict one or more implementations in accord with the present concepts, by way of example only, not by way of limitations. The drawings are not to scale. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The creation of weavable materials containing bistable electro-optic media and then the incorporation of the materials into fabrics etc. would enable switching of the fabrics and then disconnecting them from electronics since the display is stable with no power. A person would not have to carry the drive electronics at all if they did not want to. The electronics could be easily detached. This would also be beneficial for washing of the fabrics and durability. If it was desirable to have the fabric changing actively while worn, the electronics could be included with the woven fabric, but would only have to be turned on for brief periods during the updates.

In the various embodiments of the present invention, an encapsulated bistable electro-optic medium, preferably an electrophoretic dispersion is incorporated into a secondary ribbon structure. The ribbon may be formed by first producing a laminate containing the electro-optic medium in a roll-to-roll process and then converting the laminate into narrow ribbons. This ribbon may then be pulled into a protective outer structure that provides additional mechanical and environmental protection and includes highly conductive structures along the length of the ribbon to provide proper electrical driving for ribbons of very large aspect ratios (e.g. ribbons that are many meters long and only a few mm wide or less). The structure of the ribbons and the protective outer structures can be varied in geometry and composition to accommodate many different weaves and applications of the ribbons and fabrics.

The various embodiments of the present invention may include one or more of the following features in various combinations. For example, the ribbon may comprise an outer fiber formed from a material capable of mechanically holding the internal electro-optic medium and wires of the device. The outer fiber may have a substantially rectangular cross-section and have an inner internal cavity with a substantially rectangular cross-section for housing the electro-optic medium and wires that may also be configured in the form of a ribbon-like structure. Preferably, the dimensions of the outer fiber are selected such that the ribbon may be woven into sheets, while the width of each ribbon is large enough to provide a sufficient viewing surface. Furthermore, the dimensions may be selected to provide a cavity that is as large as possible relative to the thickness of the surrounding fiber to maximize the overall contrast ratio while maintaining sufficient mechanical strength of the fiber. Preferred dimensions for the cavity is at least about 300 microns×100 microns, and preferred thickness of the outer fiber surrounding the cavity is at least about 10 microns, more preferably at least about 50 microns. In a most preferred embodiment, the internal cavity of the ribbon may be large enough to accommodate a structure comprising the electro-optic medium and wires that is about 1 to 2 mm in width for improved aperture ratio and less seams between ribbons. In most embodiments, the fiber is flexible, that is the fiber can be bent to a radius and returned to flat without breaking, cracking, shorting, leaking, etc. For example, a fiber of the invention can be bent to a radius of 10 mm, e.g., 5 mm, e.g., 3 mm radius without losing functionality.

At least two conductive wire electrodes may run lengthwise along the fiber close to the cavity. The electro-optic medium and wire electrodes preferably fill the entire cavity. One wire or set of wires may be on the viewing side of the cavity and the other wire or set of wires may be located on the opposite side of the cavity. When the ends of the wires are connected to an electrical source, an electric field may be applied across the cavity to cause a change in the optical state of the electro-optic medium. In some embodiments, the wires may extend outside of the sheath or other protective shell in which the electro-optic material is contained, thereby allowing external connections. In other embodiments, the wires do not extend outside the sheath, but a hole or slice is created in the sheath or other protective shell to provide an electrical connection to the exterior. The electrode wires may be made from any conductive material, preferably a conductive metal, such as copper or tungsten. The diameter of the wires is preferably as small as is possible while maintaining enough mechanical strength to withstand the fiber making process. In the various embodiments of the present invention, the wires are preferably about 100 microns or less in diameter and more preferably about 50 microns or less. The fraction of the cavity width that is covered by opaque wires may be calculated with the formula $f=N*D/W$, where N is the number of wires on one side of the cavity, D is the wire diameter and W is the cavity width. The fraction f is preferably less than 40%, more preferably less than 20%. The wires of individual fibers may be interconnected, e.g., in series, or in parallel.

As previously mentioned, the electro-optic medium and wires may be configured in a ribbon-like structure ("EPD ribbon") and contained within the central cavity of the fiber. The electro-optic medium may be in electrical contact with the conductive wire or wires at multiple points along the length of the fiber. EPD ribbon may include one or more of the following features in various combinations. For example, the EPD ribbon may include a viewing side electrode comprising a light-transmissive substrate material and a light-transmissive conductor. The transparent conductor is preferably located adjacent the electro-optic medium. The transparent substrate may be made from a one or materials, such as PET, polycarbonate, polyolefins, PMMA, PDMS, PI or other light-transmissive polymeric materials.

The EPD ribbon may further comprise an optically switchable layer that preferably contains an encapsulated electrophoretic medium that is capable of changing multiple optical states. This layer can be a bichromal (e.g., black and white, e.g., a non-black non-white color and white, e.g., a non-black non-white color and black, or two different non-black non-white colors) or the layer may include a full-color medium. The electrophoretic medium may comprise a dispersion containing a plurality of charged particles within a liquid solvent, and the dispersion is preferably encapsulated within compartments smaller than the width of the fiber.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Application Publication No. 2015/0277160; and applications of encapsulation and macrocell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

The EPD ribbon may optionally comprise a removable secondary electrode on the non-viewing side of the electro-optic medium. The secondary electrode may be removed before integration into the fiber structure. The secondary electrode may be attached to the electro-optic medium with an adhesive material of controlled electrical properties. Materials for forming the secondary electrode include, but are not limited to, ITO, carbon ink of various types including screen printing inks, CNT and graphene on flexible substrates (e.g. PET). The secondary electrode does not need to be light transmissive; therefore, other materials for forming the secondary electrode include thin metal foils (e.g. aluminum, copper, tin, gold, silver, stainless steel) with or without an additional support substrate for the metal. Alternatively, the secondary electrode may made of a coatable material such as a carbon or silver ink that is coated directed over the layer of electro-optic medium. The secondary electrode material may be a conductive release material attached to the electro-optic medium with an adhesive of controlled electrical properties. This conductive release material may be used for protection and testing of the electro-optic medium and then removed before integration into the secondary fiber structure.

Figure 1:
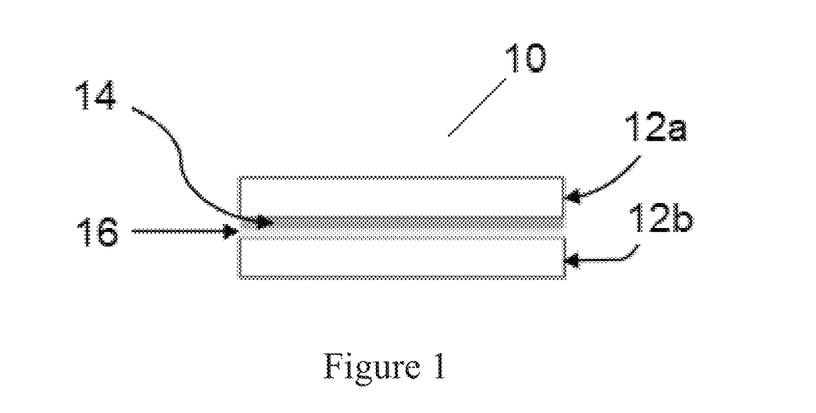
FIG. 1 is a cross-sectional view of a schematic illustration of a ribbon according to a first embodiment of the present invention.
Figure 2:
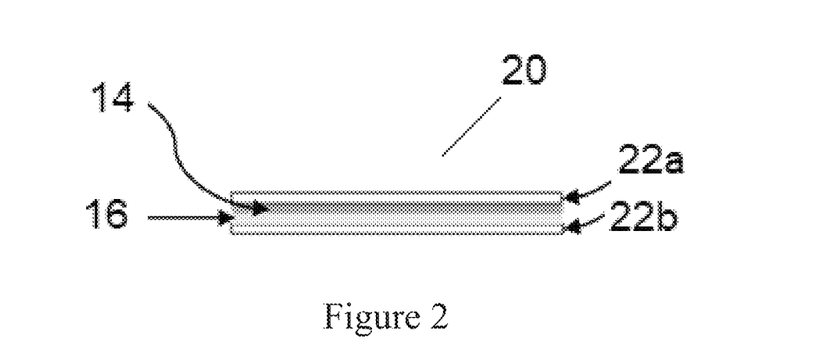
FIG. 2 is a cross-sectional view of a schematic illustration of a ribbon according to a second embodiment of the present invention.

Referring now to FIG. 1, an EPD ribbon 10 that may be incorporated into a fiber according the various embodiments of the present invention is illustrated. The EPD ribbon 10 may comprise a top electrode layer 12a and a bottom electrode layer 12b. Each electrode layer 12a, 12b may be a transparent conductor on a polymer substrate, such as a 100 to 125 micron thick PET/ITO film, wherein the polymer substrate of the electrode layer is located on the top and bottom sides of the EPD ribbon 10. Alternatively, the thickness of the PET/ITO film may be reduced to 12.5 to 50 microns for increased flexibility, such as the electrode layers 22a, 22b of the EPD ribbon 20 of FIG. 2. Between the transparent conductors of the top and bottom electrode layers 12a, 12b is a layer of encapsulated electro-optic medium 14 and a layer of lamination adhesive 16. The electro-optic medium 14 is preferably a microencapsulated electrophoretic medium in a polymeric binder that is coated to the conductor side of the top electrode layer 12a. The layer of lamination adhesive 16 may be used to adhere the layer of electro-optic medium 14 to the conductor side of the bottom electrode layer 12b. The adhesive is preferably a polymeric material that has been doped with tetrabutylammonium hexafluorophosphate or other materials as described in U.S. Pat. Nos. 7,012,735 and 7,173,752.

Figure 3:
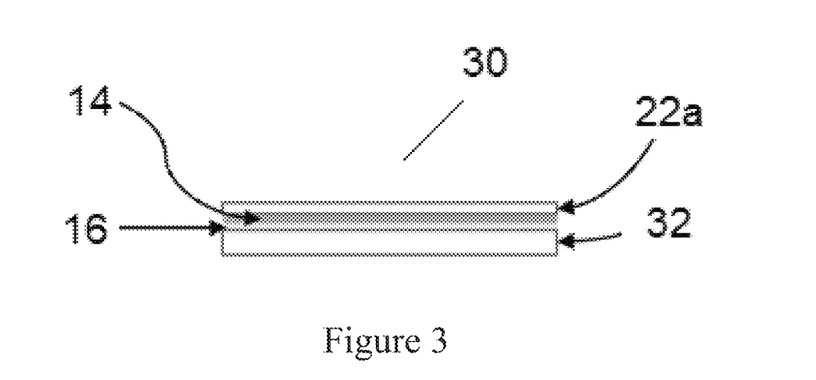
FIG. 3 is a cross-sectional view of a schematic illustration of a ribbon according to a third embodiment of the present invention.

As previously mentioned, one of the top and bottom electrode layers may be replaced with a removable secondary electrode. For example, referring to the embodiment of FIG. 3, the EPD ribbon 30 includes a top electrode layer 22a, similar to the embodiment of FIG. 2; however, the bottom electrode layer has been replaced with the removable secondary electrode 32. The secondary electrode 32 may comprise a conductive release material that may be removed prior to integration into the fiber structure. The conductive release material may be a metallized PET, for example, that is about 50 to 125 microns in thickness. The conductive release material may be used to test the optical switching properties of the electro-optic medium layer 14 prior to integration into the fiber structure.

Figure 4:
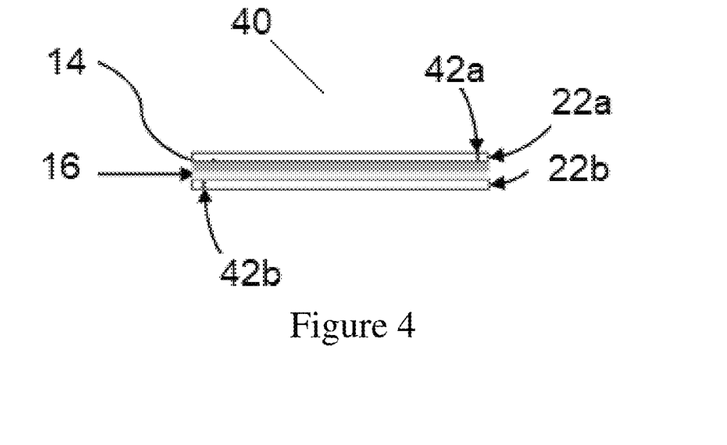
FIG. 4 is a cross-sectional view of a schematic illustration of a ribbon according to a fourth embodiment of the present invention.

Referring now to FIG. 4, the electrical contacts along the length of the EPD ribbon, such as EPD ribbon 40, may be improved by the inclusion of one or more gaps 42a, 42b in conductive portion of the top and bottom electrode layers 22a, 22b. Various methods may be employed to incorporate the gaps. For example, the gaps may be obtained by kiss-cutting the opposing sides of the electrode layers 22a, 22b with a laser. The gaps are preferably along the length of the EPD ribbon and located near the edge of the EPD ribbon 40 to avoid loss of optical performance, preferably within 100 microns. Using the proper wavelength of laser, such as a YAG laser, the gaps may be used to eliminate a portion of the ITO conductor of either electrode layer 22a, 22b, for example, without damaging the polymer substrates and other structures of the EPD ribbon. The gaps will prevent potential shorting the electrode layers of the EPD ribbon, as will be described in greater detail below.

Figure 5:
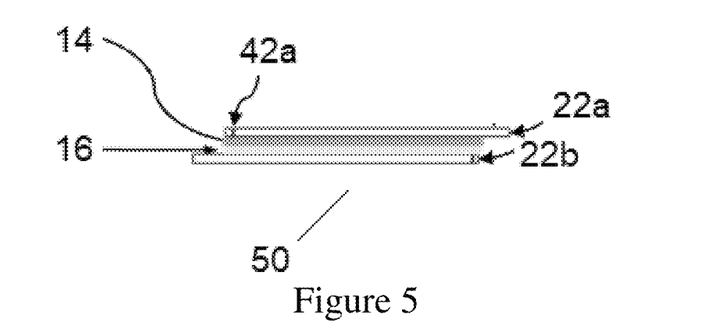
FIG. 5 is a cross-sectional view of a schematic illustration of a ribbon according to a fifth embodiment of the present invention.

In an alternative embodiment, the electrode layers 22a, 22b may be offset, as illustrated in the EPD ribbon 50 of FIG. 5, so that a portion of each electrode layer 22a, 22b extends out beyond the edge of electro-optic material 14 and/or adhesive 16. The EPD ribbon may be laminated in a way that provides for the overhang on either side, or a portion of each side of the electrode layers 22a, 22b may be removed after lamination and the portion of the electro-optic material 14 and adhesive 16 may be cleaned away along each edge to expose the ITO of each electrode layer 22a, 22b. This overhang structure may obviate the need for the kiss-cuts described in the embodiment of FIG. 4; however, both the kiss-cuts and the overhang may be used together in some embodiments.

Figure 6:
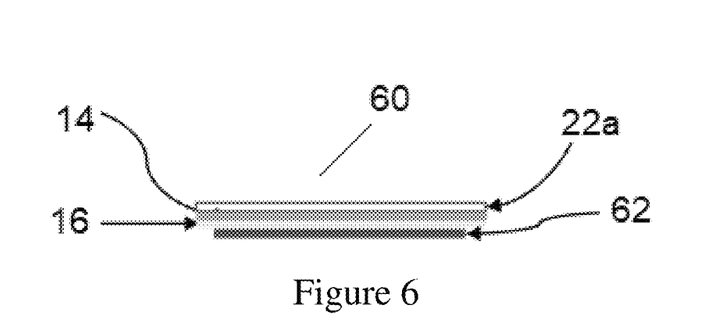
FIG. 6 is a cross-sectional view of a schematic illustration of a ribbon according to a sixth embodiment of the present invention.

In yet another embodiment, the bottom electrode of an EPD ribbon 60, as illustrated in FIG. 6, may be replaced with a solid electrode material that is not light transmissive. The solid electrode material may be made for a conductive material 62 that is coated or laminated to the lamination adhesive 16; however, the width of the solid conductor 62 is narrower than either the layer of electro-optic material 14 or the lamination adhesive 16 to avoid shorting. In this embodiment, as well as the previous embodiment, it is possible to exclude the layer of lamination adhesive 16 and apply the second bottom electrode layer to the electro-optic material 14 in order to produce a thinner EPD ribbon; however, the presence of the lamination adhesive layer 16 is helpful to avoid shorting by coating over possible pinholes in the layer of electro-optic material 14.

The EPD ribbon may then be incorporated into a fiber structure by various methods. The preferred method is a drawing process, such as the process disclosed in U.S. Patent Application Pub. No. 2018/0364518 wherein a polymeric structure with a cavity is drawn down to integrate wires or in this case an EPD ribbon into a complex micro scale fiber cross section.

Figure 7:
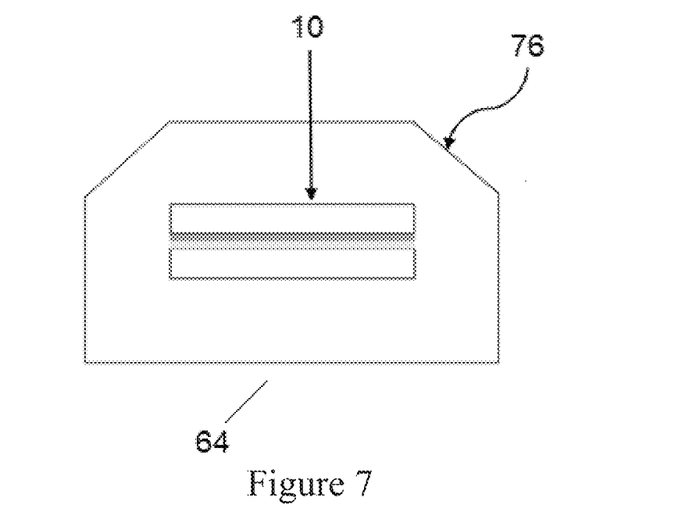
FIG. 7 is a cross-sectional view of the ribbon of FIG. 1 within a protective structure according to a seventh embodiment of the present invention.

For example, the EPD ribbon as previously described and illustrated in FIG. 1 may be incorporated into a ribbon fiber structure as illustrated in FIG. 7. The outer sheath of the fiber 64 may be made from a preform comprising a polymeric material, such as a polycarbonate or polyolefin, that is preferably light-transmissive when drawn down to the dimensions of the final fiber structure. According to one method, the preform having a similar cross-sectional shape as the ribbon 64 illustrated in FIG. 7 includes a central cavity into which one end of the EPD ribbon 7 is inserted. The central cavity may have an approximately rectangular cross section to accommodate the EPD ribbon 10. In order to connect the electrode layers within the EPD ribbon 10 to a power source and controller, the length of the EPD ribbon 10 may be longer than the outer sheath, such that the EPD ribbon 10 is exposed at one or both ends. One or both ends of the EPD ribbon 10 may then be cut or punctured to access an electrode layer. For example in one embodiment, a section of the top electrode layer, electro-optic material, and lamination adhesive may be removed at one end of the ribbon 10 to expose the bottom electrode layer, and a section of the bottom electrode, electro-optic material, and lamination adhesive may be removed from the opposite end of the ribbon 10 to expose the top electrode layer. The outer sheath of the fibers may also include chamfered edges 76, 86 on at least the viewing side of the fiber to provide a lensing effect.

In order to provide a more robust electrical connection between the electrode layers within the internal EPD ribbon and the power source and/or controller, conductive material may be incorporated into the preform. The preform which forms the outer sheath may be loaded with an electrically conductive solder-like low-melting metallic alloy. The solder-like material is preferably solid at room temperature and is incorporated into the preform structure on either side of the cavity that receives the internal EPD ribbon. At draw temperatures, the solder melts, flows and draws down together with the outer sheath to form a fiber, such as fiber 66 of FIG. 8. The solder-like material 67a, 67b can make electrical contact with the electrode layers within the EPD ribbon 10. The solder-like material may be loaded into the preform on either side of the internal cavity, such that when the preform is drawn, the solder-like material 67b on one side of the cavity contacts only the edge of the conductive layer of the bottom electrode, while the solder-like material 67a on the other side of the cavity contacts the opposing edge of the electrode layer of the top electrode only.

Figure 8:
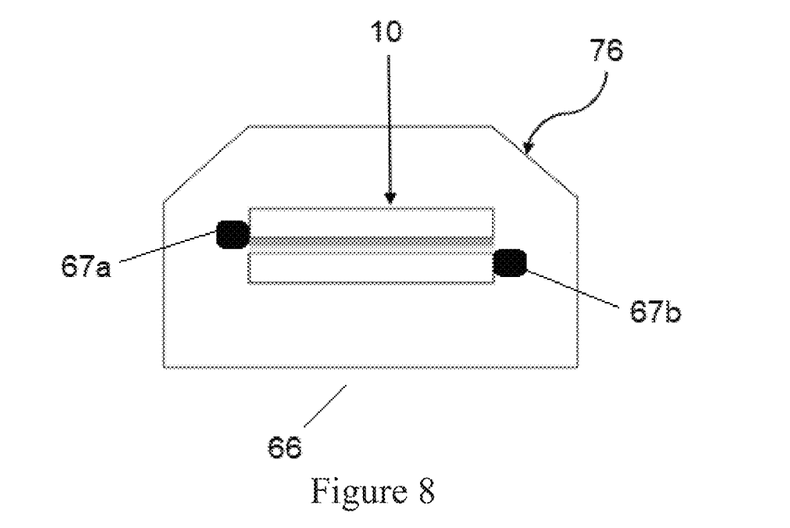
FIG. 8 is a cross-sectional view of the ribbon of FIG. 1 within a protective structure according to an eighth embodiment of the present invention.

To control the location of the solder-like material during the drawing process, the solder-like material may be at first fully surrounded by the polymeric material of the outer sheath. Preferably, the polymeric material separating the solder material from the internal cavity is provided in the form of a thin membrane that is configured to further decrease in thickness and/or break during the drawing process, so that an electrical contact will form between the solder-like material 67a, 67b and the electrode layers of the internal EPD ribbon 10. The solder material 67a, 67b present at the end faces of the ribbon 66 provide a larger contact area for electrical connection to a power source and/or controller.

Figure 9:
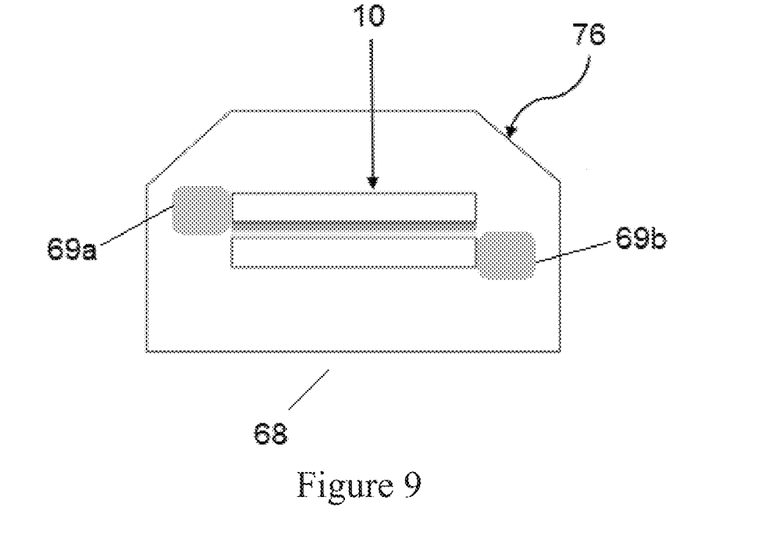
FIG. 9 is a cross-sectional view of the ribbon of FIG. 1 within a protective structure according to a ninth embodiment of the present invention.

In an alternative embodiment, the previously described solder-like material may be replaced with a conductive polymer, such as a carbon-filled polymer. The conductive polymer preferably has the same physical properties as the materials of the outer sheath, so that the conductive polymer may be pre-loaded into a preform and drawn to form a fiber. Referring to FIG. 9, the conductive polymer 69a, 69b may in some embodiments occupy a majority of the annular thickness of the outer sheath of the ribbon 68 to facilitate connection to a power source and/or controller. For example, connections to the conductive polymer 69a, 69b may be accomplished through the outer sheath with a connector similar to an insulation displacement connector.

Figure 10:
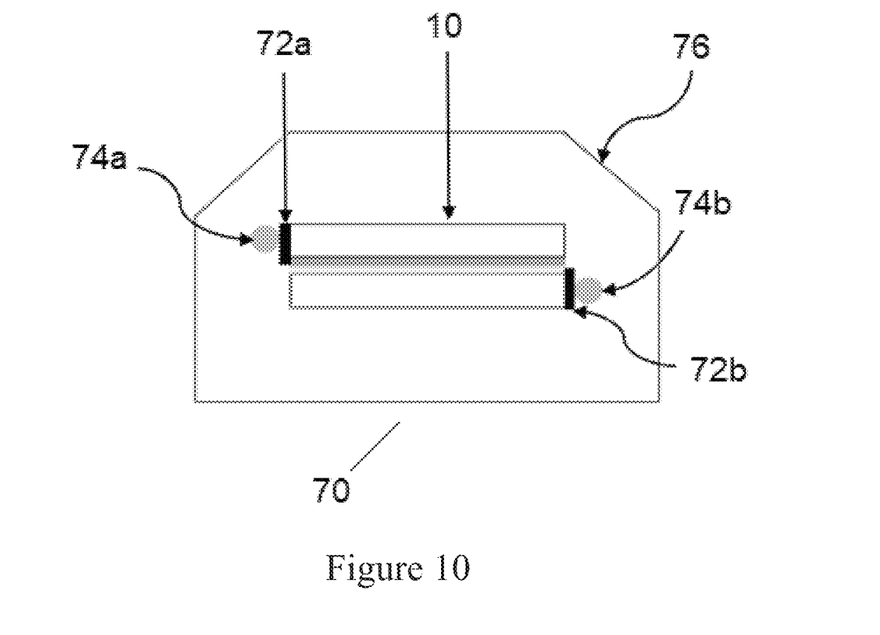
FIG. 10 is a cross-sectional view of the ribbon of FIG. 1 within a protective structure according to a tenth embodiment of the present invention.
Figure 16:
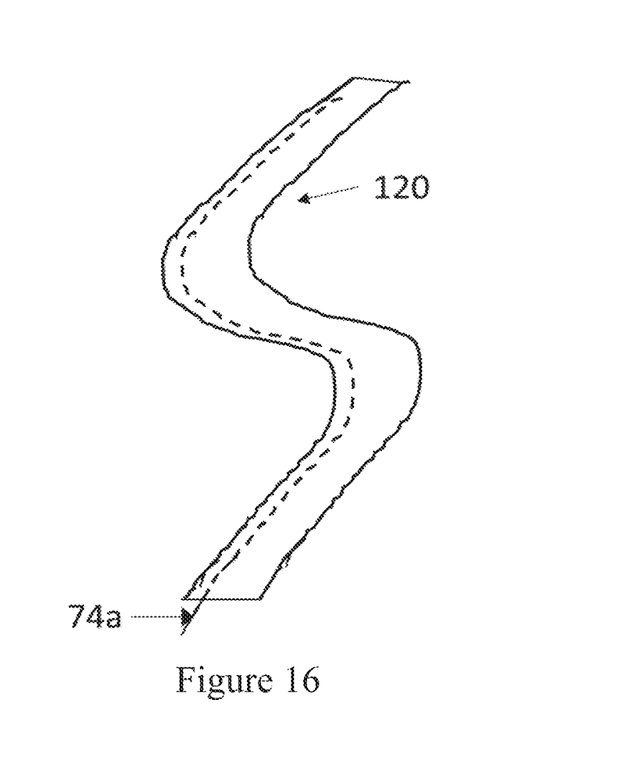
FIG. 16 is an exterior view of an embodiment of a fiber of the invention including a lead wire that allows an electrical connection from the exterior of the fiber to an interior conductive material.

To further facilitate connections with an external power source and/or controller, the ribbons made according to the various embodiments of the present invention may also include wires or leads, such as the embodiment illustrated in FIG. 10. In addition to inserting the EPD ribbon 10 into the cavity of the outer sheath, two wires 74a and 74b may be inserted into a preform, wherein one wire 74a contacts the conductive filled polymer 72a on one side of the cavity and the other wire 74b contacts the conductive filled polymer 72b on the other side of the cavity. As previously explained, the conductive filled polymer is incorporated into the preform such that the conductive filled polymer on each side of the cavity makes electrical contact with the edge of the EPD ribbon. When the preform is drawn, the dimensions of the cavity collapse in order to from a seal around the EPD ribbon 10 and wires 74a, 74b, and the conductive filled polymer 72a, 72b will contact the electrode layers of the EPD ribbon 10 at many points along the edge of the EPD ribbon 10. As shown in FIG. 16 one or more wires (74a, 74b) may extend through the fiber 120, and extend beyond the fiber 120 to provide easier external electrical connectivity.

It is not necessary to make perfect connections at every point along the edge of the EPD ribbon between the top and bottom electrode layers or their respective wires, if present, since there are many potential connection points along the length of the EPD ribbon. It is only necessary that a sufficient number of contact points are provided between the wires and the top and bottom electrodes of the EPD ribbon, so that the optical state of the electro-optical material will switch along the length of the fiber upon providing the top and bottom electrode layers with a current. It is not necessary for the conductive filled polymer to be as conductive as the wires because the conductive filled polymer is likely to conform to the edge of the EPD ribbon and outer surface of the wires to provide an improved electrical connection to the electrode layers of the EPD ribbon.

Figure 11:
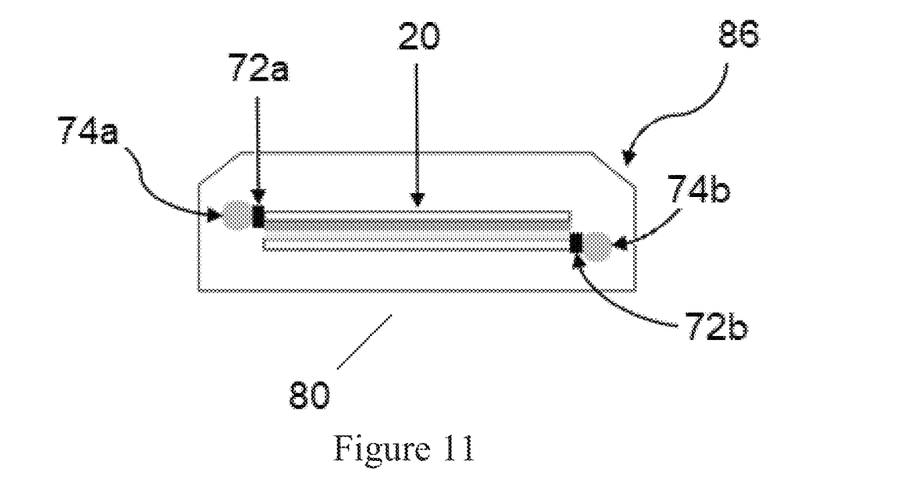
FIG. 11 is a cross-sectional view of the ribbon of FIG. 2 within a protective structure according to an eleventh embodiment of the present invention.

The thickness of the fiber may be reduced with the use of a thinner internal EPD ribbon. For example, the fiber 80 of FIG. 11 includes a thinner EPD ribbon, such as EPD ribbon 20 of FIG. 2, but otherwise has all of the same features as the previously described fiber 70.

Figure 12:
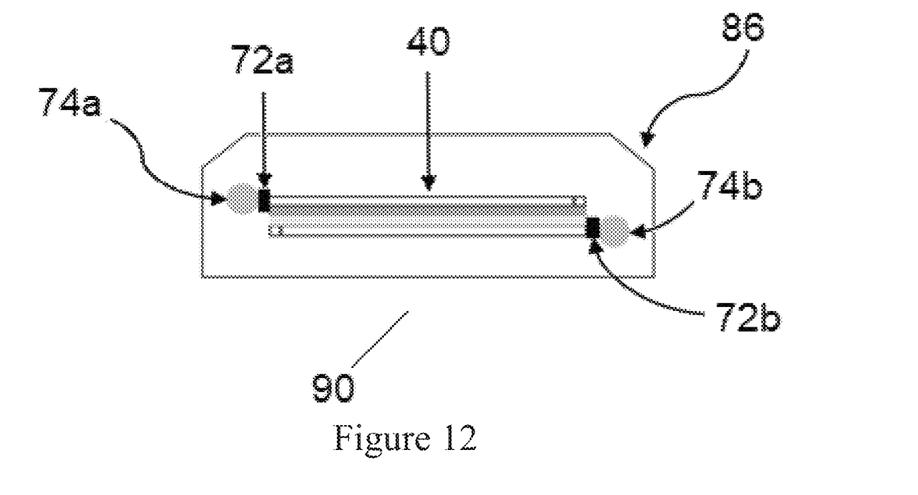
FIG. 12 is a cross-sectional view of the ribbon of FIG. 4 within a protective structure according to a twelfth embodiment of the present invention.

In another embodiment, the EPD ribbon 40 of FIG. 4 may be incorporated into the ribbon structure, such as fiber 90 of FIG. 12. The structure of the fiber 90 is essentially the same as ribbon 80 in FIG. 11, except for the inclusion of the previously described gaps in the ITO portions of the top and bottom electrodes. As previously explained, the gaps prevent potential shorts if the one or both of the conductive filled polymer 72a, 72b or wires 74a, 74b happen to contact the ITO of both the top and bottom electrode layer on one side of the EPD ribbon 40. The gap, therefore, is preferably wide enough, such that a current is unable to cross the gap; thereby, providing an electrical break to prevent a short in the EPD ribbon 40, i.e. electrically isolating the top electrode layer from the bottom electrode layer within the EPD ribbon 40.

Figure 13:
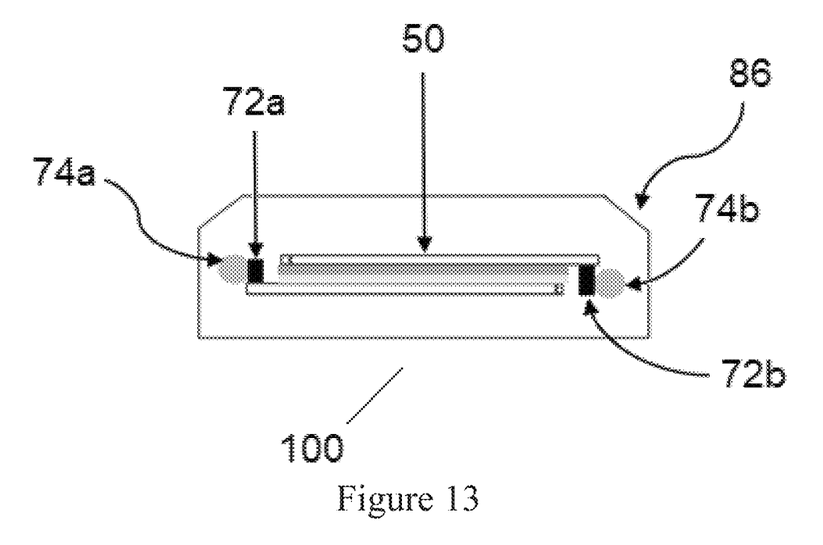
FIG. 13 is a cross-sectional view of the ribbon of FIG. 5 within a protective structure according to a thirteenth embodiment of the present invention.

According to another embodiment of the present invention, to provide further electrical isolation, the fiber may include an internal EPD ribbon structure similar to EPD ribbon 50, as illustrated in FIG. 13. The overhang on either side of the EPD ribbon 50 is preferably sufficiently wide, such that the conductive filled polymer 72a, 72b will only contact one of the top or bottom electrode layer of the EPD ribbon 50. As previously mentioned, the ribbon 50 may further include gaps in the ITO layer of the top and bottom electrode layers to further reduce the likelihood of a short; however, this is optional.

In another embodiment of a fiber according to the present invention, an EPD ribbon 60 having only a single light-transmissive top electrode, as illustrated in FIG. 6, may be incorporated into a fiber structure. For example, referring to FIG. 14, an EPD ribbon 60 having a light transmissive top electrode layer along with two wires 74a and 74b may be incorporated into a preform, wherein the preform includes a conductive filled polymer 72a, 72b. The conductive filled polymer 72a, 72b is configured, such that when the preform is drawn, the conductive filled polymer 72a, 72b provides an electrical contact along each edge of the EPD ribbon 60 between the ITO portion of the top electrode layer and one of the two wires 74a, 74b. This may increase the number of electrical connections with the top electrode within the EPD ribbon 60.

Figure 14:
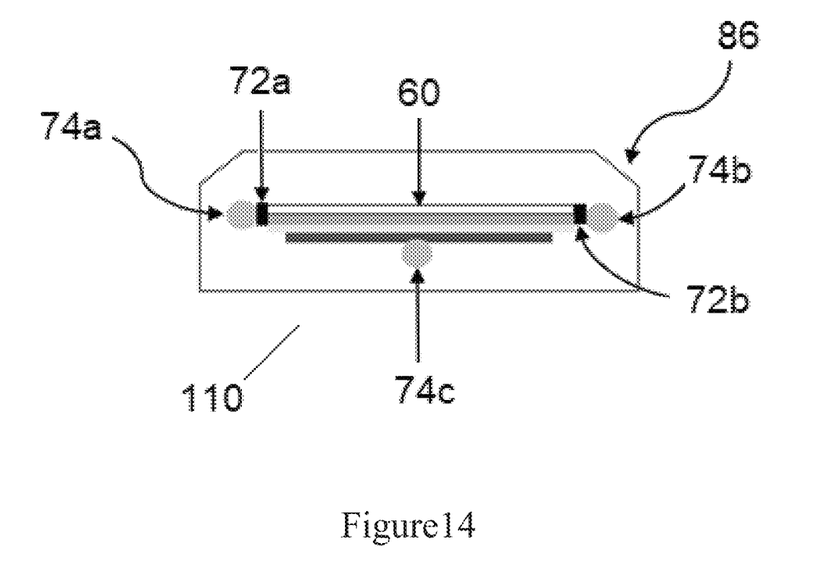
FIG. 14 is a cross-sectional view of the ribbon of FIG. 6 within a protective structure according to a fourteenth embodiment of the present invention.

Prior to loading the EPD ribbon 60 into the cavity of the preform, the EPD ribbon 60 may include an optional releasable layer that is removed to reveal the adhesive layer of the EPD ribbon 60. After removing the optional releasable layer, a solid conductor is applied to the adhesive layer. As previously mentioned, the solid conductor may be coated or laminated to the bottom of adhesive layer and preferably has a width that is less than the width of the EPD ribbon 60, so that the solid conductor does not contact either the conductive filled polymer 72a, 72b on the sides of the EPD ribbon 60 or the top electrode wires 74a, 74b; thereby avoiding a potential short. An additional wire 74c may be inserted into the preform prior to drawing the preform, so that the wire 74c is in electrical contact with the solid conductor along the length of the fiber 110.

Figure 15:
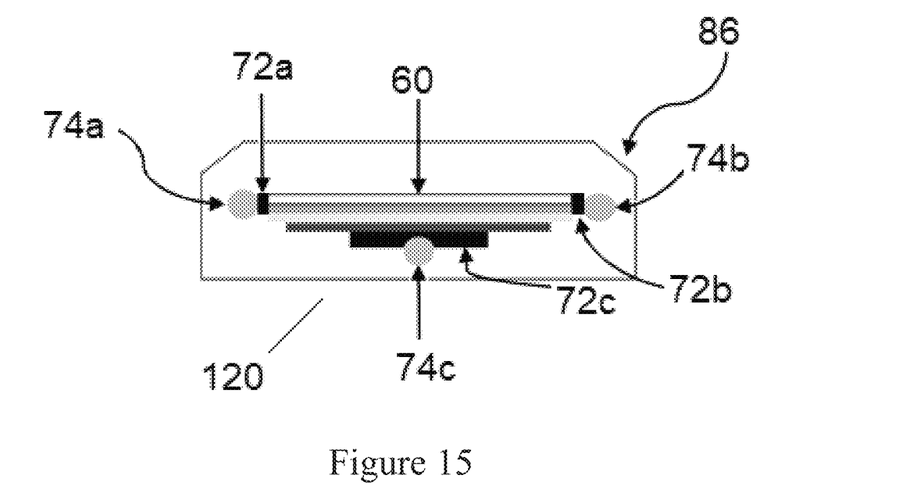
FIG. 15 is a cross-sectional view of the ribbon of FIG. 6 within a protective structure according to a fifteenth embodiment of the present invention.

As previously mentioned, it is not necessary for the solid conductor to be light transmissive; therefore, the solid conductor may comprise a metal foil or other conductive material. In order to improve, the electrical contact between solid conductor and the wire 74c, a conductive filled polymer 72c, similar to the other conductive filled polymer, may be applied between the solid conductor and the wire 74c, such as the fiber 120 illustrated in FIG. 15. However, this may result in a thick fiber. Alternatively, the conductive filled polymer 72c on the bottom of the EPD ribbon 60 may be used by itself, instead of applying a solid conductor. Because the bottom solid conductor has a small width that the ITO portion of the top electrode layer within the EPD ribbon 60, the electrical properties of the adhesive layer may be controlled to allow the ink to bloom and facilitate optical switching of the electro-optic material along the edges of the EPD ribbon 60. As used herein "blooming" means the area of the electro-optic layer which changes optical state in response to a change of voltage is larger than the area of the electrode, in this case area of the solid conductor, which is in contact with the adhesive layer. Again, this blooming phenomenon may be controlled by incorporating certain dopants in the polymeric material of the adhesive.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

The invention claimed is:

1. A fiber comprising:
    a laminate having a cross-sectional width greater than a thickness of the laminate, the laminate comprising a first electrode layer, a second electrode layer, and a layer of electro-optic material disposed between the first and second electrode layers, at least one of the first and second electrode layers being light-transmissive;
    a sheath surrounding the laminate;
    a first portion of conductive filled polymer;
    a first wire extending longitudinally through the sheath, the first wire being in electrical contact with the first electrode layer via the first portion of conductive filled polymer, and providing a conductive pathway from an exterior of the sheath to the first electrode layer;
    a second portion of conductive filled polymer; and
    a second wire extending longitudinally through the sheath and in electrical contact with the second electrode layer via the second portion of conductive filled polymer, and providing a conductive pathway from an exterior of the sheath to the second electrode layer.

2. The fiber of claim 1, wherein a cross-sectional width of the fiber is greater than a thickness of the fiber.

3. The fiber of claim 1, wherein both the first and second electrode layers are flexible.

4. The fiber of claim 3, wherein the first and second electrode layers are both light-transmissive.

5. The fiber of claim 1, wherein an edge of the first electrode layer extends beyond a first edge of the layer of electro-optic material and an edge of the second electrode layer extends beyond a second edge of the layer of electro-optic material.

6. The fiber of claim 1, wherein at least one of the first and second electrode layers includes a gap along a length of the fiber.

7. The fiber of claim 1, wherein at least one of the first and second electrode layers comprises a solid conductor.

8. The fiber of claim 1, wherein the sheath includes a chamfered edge.

9. The fiber of claim 1, wherein the layer of electro-optic material comprises an encapsulated electrophoretic dispersion.

10. The fiber of claim 9, wherein the encapsulated electrophoretic dispersion comprises a plurality of microcapsules each containing an electrophoretic dispersion.

11. The fiber of claim 10, wherein the electrophoretic dispersion comprises a plurality of charged particles in a solvent.

12. The fiber of claim 11, wherein the plurality of charged particles includes a first particle of a first color and a first charge and a second particle of a second color and a charge opposite the first charge.

13. The fiber of claim 1, wherein the sheath is a polycarbonate preform.

14. The fiber of claim 13, wherein the polycarbonate preform is sealed to prevent moisture ingress or egress.

* * * * *